(12) United States Patent
Winters et al.

(10) Patent No.: US 10,756,918 B2
(45) Date of Patent: Aug. 25, 2020

(54) ACTIVATING A DEVICE VIA A MODULE-BASED DEVICE INTERACTION SYSTEM

(75) Inventors: Jason Thomas Winters, Winston-Salem, NC (US); Peter Hans Scharler, Uniontown, PA (US)

(73) Assignee: ioBridge, Inc., Marlborough, MA (US)

( * ) Notice: Subject to any disclaimer, the term of this patent is extended or adjusted under 35 U.S.C. 154(b) by 0 days.

(21) Appl. No.: 13/351,608

(22) Filed: Jan. 17, 2012

(65) Prior Publication Data

US 2012/0131158 A1 May 24, 2012

Related U.S. Application Data

(63) Continuation-in-part of application No. 12/629,455, filed on Dec. 2, 2009, now Pat. No. 8,271,629.

(Continued)

(51) Int. Cl.
*H04L 12/28* (2006.01)
*H04L 29/12* (2006.01)
(Continued)

(52) U.S. Cl.
CPC .......... *H04L 12/2803* (2013.01); *H04L 12/12* (2013.01); *H04L 61/2589* (2013.01);
(Continued)

(58) Field of Classification Search
CPC ....... H04L 12/12; H04L 67/12; H04L 67/025; H04L 67/2803; H04L 12/2803; H04L 67/125
(Continued)

(56) References Cited

U.S. PATENT DOCUMENTS 5,822,398 A   10/1998 Hall
5,915,119 A * 6/1999 Cone .............................. 713/310
(Continued)

FOREIGN PATENT DOCUMENTS

ES        2315049 A1 *  3/2009
JP    2005109763 A  *  4/2005

OTHER PUBLICATIONS

Gil-Martínez-Abarca, J.A, Marcos-Jorquera, D., Gilart-Iglesias, V. "Wake on LAN over Internet as Web Service." Published in: IEEE Conference on Emerging Technologies and Factory Automation, 2006. Sep. 20-22, 2006. pp. 1261-1268.*

(Continued)

*Primary Examiner* — Aaron N Strange
(74) *Attorney, Agent, or Firm* — Cesari and McKenna, LLP; Omar M. Wadhwa

(57) ABSTRACT

A system that enables a person to monitor and/or control a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API. Furthermore, the hardware module and the module server may enable the activation of an inactive device from a remote location.

22 Claims, 6 Drawing Sheets

Related U.S. Application Data

(60) Provisional application No. 61/200,692, filed on Dec. 2, 2008.

(51) Int. Cl.
*H04L 29/08* (2006.01)
*H04L 12/12* (2006.01)

(52) U.S. Cl.
CPC ............ *H04L 67/025* (2013.01); *H04L 67/12* (2013.01); *H04L 67/125* (2013.01)

(58) Field of Classification Search
USPC .......................................... 709/222; 713/310
See application file for complete search history.

(56) References Cited

U.S. PATENT DOCUMENTS

| | | | |
|---|---|---|---|
| 6,332,202 B1 | 12/2001 | Sheikh et al. | |
| 6,421,782 B1 | 7/2002 | Yanagisawa et al. | |
| 6,526,507 B1 | 2/2003 | Cromer et al. | |
| 6,591,368 B1 | 7/2003 | Ryu | |
| 6,628,663 B1 | 9/2003 | Cromer et al. | |
| 6,785,805 B1 | 8/2004 | House | |
| 6,826,689 B1 | 11/2004 | Hou | |
| 6,996,773 B2 | 2/2006 | Friedman et al. | |
| 7,155,213 B1* | 12/2006 | Almeda | H04M 1/72533 |
| | | | 455/419 |
| 7,170,391 B2 | 1/2007 | Lane et al. | |
| 7,216,043 B2* | 5/2007 | Ransom | G01D 4/004 |
| | | | 702/60 |
| 7,248,978 B2* | 7/2007 | Ransom | G01D 4/004 |
| | | | 702/182 |
| 7,298,259 B2 | 11/2007 | Moriwaki | |
| 7,334,051 B2 | 2/2008 | Koyata et al. | |
| 7,350,238 B2 | 3/2008 | Abe et al. | |
| 7,379,474 B1 | 5/2008 | Wong | |
| 7,450,638 B2 | 11/2008 | Iwamura | |
| 7,600,064 B2 | 10/2009 | Knowles et al. | |
| 7,643,487 B2 | 1/2010 | Sethuram et al. | |
| 7,725,944 B2 | 5/2010 | Spalink et al. | |
| 7,734,380 B2* | 6/2010 | Ransom | G01D 4/004 |
| | | | 380/258 |
| 7,780,514 B2 | 8/2010 | Walker et al. | |
| 7,861,006 B2 | 12/2010 | McNulty | |
| 7,908,666 B2 | 3/2011 | Chida et al. | |
| 9,746,907 B2* | 8/2017 | Zhang | H04L 12/12 |
| 2001/0025349 A1* | 9/2001 | Sharood | G06Q 30/0235 |
| | | | 713/340 |
| 2002/0038371 A1 | 3/2002 | Spacey | |
| 2003/0058843 A1* | 3/2003 | Nishikawa | H04L 12/2803 |
| | | | 370/352 |
| 2003/0105854 A1* | 6/2003 | Thorsteinsson | G06F 9/542 |
| | | | 709/223 |
| 2003/0145053 A1* | 7/2003 | Bodin | H04L 29/06 |
| | | | 709/205 |
| 2003/0204756 A1* | 10/2003 | Ransom | G01D 4/004 |
| | | | 713/300 |
| 2003/0215114 A1 | 11/2003 | Kyle | |
| 2003/0217110 A1* | 11/2003 | Weiss | H04L 67/12 |
| | | | 709/207 |
| 2004/0138835 A1* | 7/2004 | Ransom | G01D 4/004 |
| | | | 702/62 |
| 2005/0005026 A1* | 1/2005 | Brown et al. | 709/245 |
| 2005/0021711 A1 | 1/2005 | Stieger et al. | |
| 2005/0055725 A1 | 3/2005 | Stewart | |
| 2005/0101312 A1* | 5/2005 | Kang | H04L 12/2803 |
| | | | 455/422.1 |
| 2005/0138432 A1* | 6/2005 | Ransom | G01D 4/004 |
| | | | 726/4 |
| 2005/0177507 A1 | 8/2005 | Bandych et al. | |
| 2005/0180326 A1 | 8/2005 | Goldflam et al. | |
| 2005/0204190 A1* | 9/2005 | Cromer | G06F 1/3206 |
| | | | 714/14 |
| 2005/0208825 A1 | 9/2005 | Chan | |
| 2006/0067357 A1 | 3/2006 | Rader | |
| 2006/0077423 A1 | 4/2006 | Mathieson et al. | |
| 2006/0181846 A1 | 8/2006 | Farnsworth et al. | |
| 2006/0227761 A1* | 10/2006 | Scott, III | H04L 12/2803 |
| | | | 370/352 |
| 2006/0253539 A1* | 11/2006 | Casperson | H04L 29/12103 |
| | | | 709/207 |
| 2007/0067445 A1* | 3/2007 | Vugenfirer et al. | 709/224 |
| 2007/0070998 A1 | 3/2007 | Sethuram et al. | |
| 2007/0162417 A1 | 7/2007 | Cozianu et al. | |
| 2007/0192579 A1 | 8/2007 | Lee et al. | |
| 2007/0245086 A1 | 10/2007 | Odom | |
| 2007/0250597 A1 | 10/2007 | Resner et al. | |
| 2008/0076528 A1 | 3/2008 | Nguyen et al. | |
| 2008/0080500 A1* | 4/2008 | Shimura | H04L 12/12 |
| | | | 370/389 |
| 2008/0221737 A1* | 9/2008 | Josephson | G01D 4/02 |
| | | | 700/276 |
| 2008/0229091 A1* | 9/2008 | Abu-Akel | H04L 12/12 |
| | | | 713/2 |
| 2008/0319914 A1 | 12/2008 | Carrott | |
| 2009/0067441 A1 | 3/2009 | Ansari | |
| 2009/0119766 A1* | 5/2009 | Huetter | H04L 12/2803 |
| | | | 726/12 |
| 2009/0132681 A1* | 5/2009 | Schneider | G06Q 30/02 |
| | | | 709/219 |
| 2009/0172163 A1* | 7/2009 | Carroll | H04L 12/12 |
| | | | 709/226 |
| 2009/0210519 A1* | 8/2009 | Zill et al. | 709/220 |
| 2009/0216827 A1 | 8/2009 | Hirase et al. | |
| 2009/0285545 A1 | 11/2009 | Bon | |
| 2010/0057943 A1 | 3/2010 | Petricoin, Jr. | |
| 2010/0076662 A1 | 3/2010 | Sheidler | |
| 2010/0174660 A1 | 7/2010 | Clark et al. | |
| 2010/0191795 A1 | 7/2010 | Hering | |
| 2010/0235279 A1 | 9/2010 | Bouchard et al. | |
| 2010/0260037 A1 | 10/2010 | Wu et al. | |
| 2011/0046792 A1* | 2/2011 | Imes | H04L 63/105 |
| | | | 700/278 |
| 2011/0131292 A1 | 6/2011 | McNulty | |
| 2011/0225293 A1 | 9/2011 | Rathod | |
| 2012/0131158 A1 | 5/2012 | Winters et al. | |
| 2012/0278636 A1* | 11/2012 | Lin et al. | 709/218 |
| 2013/0143651 A1* | 6/2013 | Harrison | H04L 63/107 |
| | | | 463/31 |
| 2014/0298066 A1* | 10/2014 | Zhang | H04L 12/12 |
| | | | 713/323 |

OTHER PUBLICATIONS

Maciá-Pérez et al. Machine translations of description and claims for Spanish patent application #200501234, filed May 20, 2005 and published in Spanish on Mar. 16, 2009 as publication No. ES2315049A1.*

"wake up on LAN". Author unknown. Post dated Sep. 10, 2004. 2 pages. Available online: http://www.nbtnet.newboundary.com/forum/Topic687-20-1.aspx.*

"wake up on LAN problems". Author unknown. Post dated May 15, 2007. 2 pages. Available online: http://www.nbtnet.newboundary.com/forum/Topic1485-5-1.aspx.*

"Troubleshooting tips for Wake on LAN (WOL)". Author unknown. dated Oct. 4, 2005. Archived Jan. 2, 2007. 3 pages. Available online: https://web.archive.org/web/20070102040558/http://www.nbtnet.newboundary.com/supportkb/Article.aspx?id=10264.*

"Prism Deploy Guide." Author unknown. Published Dec. 2010 by New Boundary Technologies, Inc. 92 pages.*

Yehuda Katz. wake_on_lan.widget.php. 78 lines on 3 pages. Posted Dec. 15, 2010. Available online: https://github.com/pfsense/pfsense/commit/254ac496401b2259a17dc2deee1fa19f963d89c6.*

Yehuda Katz et al. "Feature #1103: Wake-on-Lan Widget for Dashboard (with code)". Dec. 14, 2010. 2 pages. Available online: https://redmine.pfsense.org/issues/1103.*

Pan-Lung Tsai, Chin-Laung Lei, Wen-Yang Wang. "A Remote Control Scheme for Ubiquitous Computing." In "Proceedings of the

(56) References Cited

OTHER PUBLICATIONS

2004 IEEE International Conference on Networking, Sensing, and Control". Taipei, Taiwan: Mar. 21-23, 2004. pp. 1020-1025.*

Machine translation of JP 2005109763 A.*

Guido Socher. "Using the tuxgraphics embedded web server for Wake on Lan (WOL)". 5 pages. Dated Apr. 14, 2014. Archived Apr. 25, 2009. Available online: https://web.archive.org/web/20090425154159/http://tuxgraphics.org/electronics/200904/wol.shtml.* tscot91 et al. "WOL Question—Different Subnets in Same Building". Aug. 25-Sep. 9, 2010. 4 pages. Available online: https://www.ibm.com/developerworks/community/forums/html/topic?id=77777777-0000-0000-0000-000014739143.*

Author Unknown. "BigFix Power Management: User's Guide". Published by BigFix, Inc. Apr. 2009. 26 pages.* ioBridge. "X10 Home Automation: Control your X10 modules online via your secure dashboard or website". Archived Aug. 6, 2010. 2 Pages. Available online: https://web.archive.org/web/20100806181211/http://www.iobridge.com/technology/x10-home-automation.html.* cygnet853. "x10 control with ioBridge". YouTube video uploaded Dec. 7, 2008. One minute, 23 seconds. Available online: https://www.youtube.com/watch?v=Pr-DkaWkK0o.* ioBridge. "IO-204 Monitor & Control Module". Updated Dec. 30, 2008. Archived Jan. 26, 2009. 10 pages. Available online: https://web.archive.org/web/20090126231854/http://iobridge.com/technology/IO-204_manual.pdf.* ioBridge. "Technology: Here is how are [sic] system works." Archived Dec. 10, 2008. 2 printed pages. Available online: https://web.archive.org/web/20081210154400/http://www.iobridge.com/technology/.* ioBridge. "Data Feed API". Updated Dec. 25, 2008. Archived Jan. 26, 2009. 9 pages. Available online: https://web.archive.org/web/20090126205433/http://iobridge.com/technology/Data_Feed_API.pdf.*

C Morris (ed.). "Module". In Academic press Dictionary of science and technology. Oxford, United Kingdom: Elsevier Science & Technology, 1992. 2 pages. Available from: http://search.credoreference.com/content/entry/apdst/module/0.* wolfgang. "ioBridge Connect > Forums > General > Feature Requests > WOL, Wake on Lan". Originally dated Apr. 12, 2009. 2 printed pages. Available online: https://web.archive.org/web/20160509172136/http://connect.iobridge.com/forum/topic/wol-wake-on-lan/.*

Alan Hourihane, Robert Ellison, and Brian Paul. "VNC Proxy User Guide." Archived Mar. 3, 2008. 4 printed pages. Available online: http://web.archive.org/web/20080303205346/http://vncproxy.sourceforge.net/proxy.html.*

* cited by examiner

ACTIVATING A DEVICE VIA A MODULE-BASED DEVICE INTERACTION SYSTEM

CROSS-REFERENCE TO RELATED APPLICATIONS

This application is a continuation-in-part of application Ser. No. 12/629,455, filed Dec. 2, 2009, now issued U.S. Pat. No. 8,271,629, issued on Sep. 18, 2012, which claims benefit from provisional patent application Ser. No. 61/200,692, filed Dec. 2, 2008. This application is also related to application Ser. No. 13/220,685, filed Aug. 30, 2011, which claims benefit from provisional patent application Ser. No. 61/378,207, filed Aug. 30, 2010. All these aforementioned applications are incorporated by reference herein, in their entireties, for all purposes.

TECHNICAL FIELD

This application relates generally to the control of remote mechanisms via a network. More particularly, the present invention relates to a system and method for activating an inactive device from outside of the device's local network.

BACKGROUND

Controlling devices over the Internet requires considerable knowledge across several fields. For example, to manipulate a device via the Internet, such as via an interactive Web site, a person may need to understand Web site design, networking, server management, communication protocols, multiple programming languages, embedded systems, and mechatronics. As such, the vast majority of people do not possess the necessary skills to configure a system allowing for the control of a device via the World Wide Web.

In addition to the knowledge required, the hardware requirements of such an undertaking are prohibitive to small entities, such as individuals or small organizations. Current Web-based device monitoring and control interface systems are meant for industrial applications. The expense and power requirements of industrial equipment are too great to make this a realistic solution. In addition, the equipment is rather large, consuming large cabinets and racks impractical for home or small business use. This solution may also require familiarity with the equipment's programming interface and custom cabling and hardware.

Other current solutions for Web-based device control require a person to establish a server which accepts requests from the Internet. These servers are typically embedded Web servers that host their own Web pages for device interaction. The Internet connections employed by small entities are typically based on dynamic internet protocol (IP) address assignment. Hosting a server on a dynamic IP address is problematic because the IP address may change, causing a disruption in the server's connection to the Internet and preventing a remote user from contacting the server. Additionally, hosting a server requires the user to configure the local network. An average person may have difficulty with the intricacies of remapping router ports and other such matters. Furthermore, some individuals may not have access to their Internet connection networking equipment, such as people living in apartment complexes or dormitories. Internet Service Providers (ISPs) may cause additional problems for server-based architectures. Many ISPs frown upon users hosting servers and may block ports used for this.

Both the aforementioned industrial and server solutions lack convenient mechanisms for Web site and Web service integration. Considerable knowledge of Hypertext Markup Language (HTML), JavaScript, and Application Programming Interfaces (APIs) are required to place any controls on a Web site or to establish access via a Web service (such as a social network), web application, desktop program, mobile application, or the like. As a result, such a solution requires customized Web site integration which, again, is beyond the skills of the average user.

One particular control procedure, Wake-on-LAN (WOL), pertains to activating ("waking") a device, such as a computer, from a remote location. An individual or an organization may wish to employ WOL to save on the costs accrued from running unnecessary devices full time. For example, a field agent may require occasional remote access to a computer at his company's headquarters. WOL technology would allow the company to only pay for the energy used by the computer when it was in use by the remote field agent. However, current systems do not allow for convenient or cost-effective WOL configurations, particularly when the device needs to be activated from outside the local network. For example, WOL is often accomplished by a user remotely connecting to a peer computer on a network and having it send a special network message, called a "magic packet," to the desired computer on the same network. The magic packet contains the media access control (MAC) address of the desired computer, thereby identifying it. This configuration requires that the peer computer be left continuously activated in order to activate other computers and, thus, does not resolve the problem, as power must be provided to the peer computer.

What is needed is a convenient system and method that enables an average person to configure an architecture to control or monitor a device via a Web-based medium. Furthermore, what is needed is a system and method for enabling a user to activate an inactive device via a Web-based medium.

SUMMARY

The present invention addresses the aforementioned needs by providing a system that enables a person to monitor and/or control a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API. Furthermore, the hardware module and the module server may enable the activation of an inactive device from a remote location.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

Figure 1:
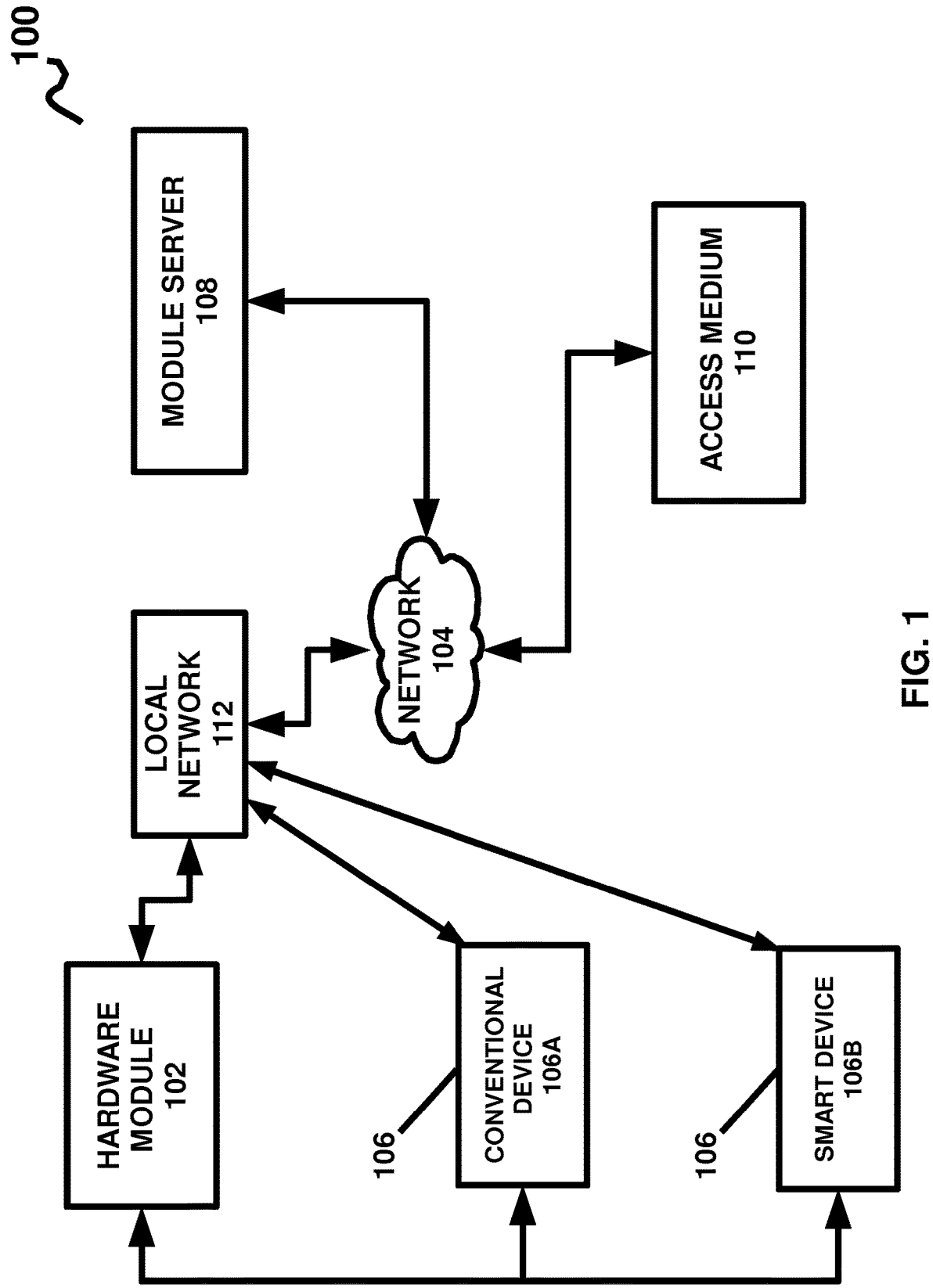
FIG. 1 illustrates a general architecture overview of an embodiment of a module-based device interaction system.

FIG. 1 illustrates a general architecture overview of an embodiment of a module-based device interaction system (MBDIS) 100. Although only a single instance of each component is depicted, this is for illustrative purposes only and is not to be construed as limiting. The components of the MBDIS 100 may interact with one another via a network 104, which may be any applicable electronic and/or wireless network. For example, the network 104 may be a wide-area network (WAN), such as the Internet or a mobile network. The MBDIS 100 may include a hardware module 102 configured to be an input/output (I/O) mechanism and enabled to allow for connections to one or more devices 106. A device 106 may include any applicable electronic device, such as a computer, a server, a sensor, a printer, a servo, an actuator, a switch, a control system, or the like. The hardware module 102 may be connected via the network 104 to a module server 108, thereby serving as a link between the device 106 and the module server 108. The hardware module 102 may connect to the network 104 via a local network 112, such as a local area network (LAN) or wireless local area network (WLAN). As used herein, the local network 112 may include any component (physical or logical) necessary for the particular network's implementation, such as routers, adapters, subnets, and the like. For example, various components may interact with one another via a router. Instead of, or in addition to, being connected to the hardware module 102 directly, a device 106 may interface with the hardware module 102 via the local network 112 and the local network 112 may enable interaction between the hardware module 102 and the device 106. Although not explicitly depicted in FIG. 1, a device 106 may also interface with the hardware module 102 via the network 104, either in conjunction with the local network 112 or independent from it.

The module server 108 may receive data messages sent by the hardware module 102, such as those relayed from an interfaced device 106. The module server 108 may relay such communication to an access medium 110 and/or another hardware module 102 connected to the network 104. The module server 108 may interface with an access medium 110 to transmit communications to or from the hardware module 102 and to configure the hardware module 102.

An access medium 110 may be a mechanism by which a user may control or monitor a device 106. For example, an access medium 110 may enable a user to operate a device 106, monitor the status of a device 106, receive and/or review data generated by a device 106, activate a device 106, or the like. In one embodiment, an access medium 110 may be accessible by various agents, such as a personal computer, a mobile device, or the like. For example, an access medium 110 may be a Web service, such as, for example, a streaming server, a push-driven server, an email server, a social network, a database, an event notification service, a scripting server, a Web page, or the like. Additionally, an access medium 110 may comprise an API, such as a Web widget or gadget, another convenient programming interface, or the like. Alternatively, an access medium 110 may be a Web interface, such as a dynamic scripting, a Flash interface, or the like.

Data transmitted between one or more of the device 106, the hardware module 102, the module server 108, and the access medium 110 may be encrypted, such as via a compressible encryption technique encapsulated and translated over common internetworking protocols and networking technologies.

Hardware Module

The hardware module 102 may act as a client to the module server 108. This configuration enables the MBDIS 100 to overcome problems inherent in hosting a server. A dynamic IP address is no longer problematic. The hardware module 102 may initiate the connection to the module server 108 and, as such, there is no need to keep track of the user's IP address. Additionally, an ISP does not block outbound traffic from a user's location (as opposed to in-bound traffic, as would be the case if the user employed a local server), as this would be the equivalent to preventing the user from accessing the Internet entirely. Furthermore, as the hardware module 102 itself establishes the connection as a client to the module server 108, there is no need for any network configuration on the part of the user. All traffic generated by the use of the hardware module 102 is viewed as normal traffic by the network 104. This enables the hardware module 102 to work through firewalls and proxy servers.

The design of the hardware module 102 may vary per implementation. In one example, the hardware module 102 may be constructed of a two-sided, 0.060 inch-thick printed circuit board (PCB). A top and bottom plate of 0.125 inch clear acrylic, fixed in place by spacers and screws, may provide a simple exterior structure for the hardware module 102. A label on the top surface of the hardware module 102 may indicate the model number, serial number, connection assignments, MAC address, and I/O channel pin out, and the like. In totality, the hardware module 102 may be 3.8 inches×2.5 inches×1.24 and weigh approximately 90 grams. In other scenarios, the hardware module 102 may be smaller or larger and may be constructed of different materials.

Figure 2:
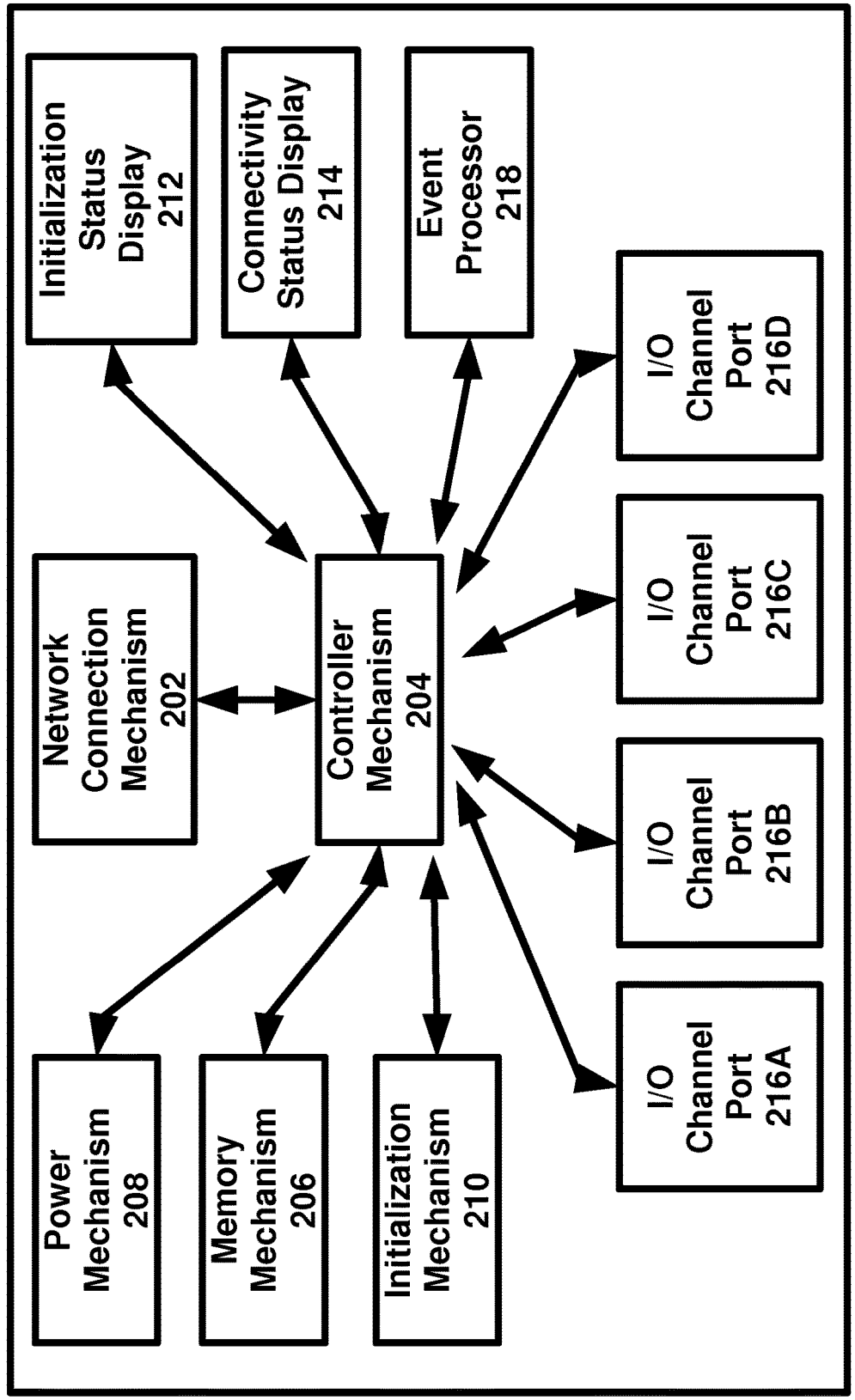
FIG. 2 illustrates an example of an embodiment of a hardware module enabled for Web-based device control or monitoring.
Figure 3:
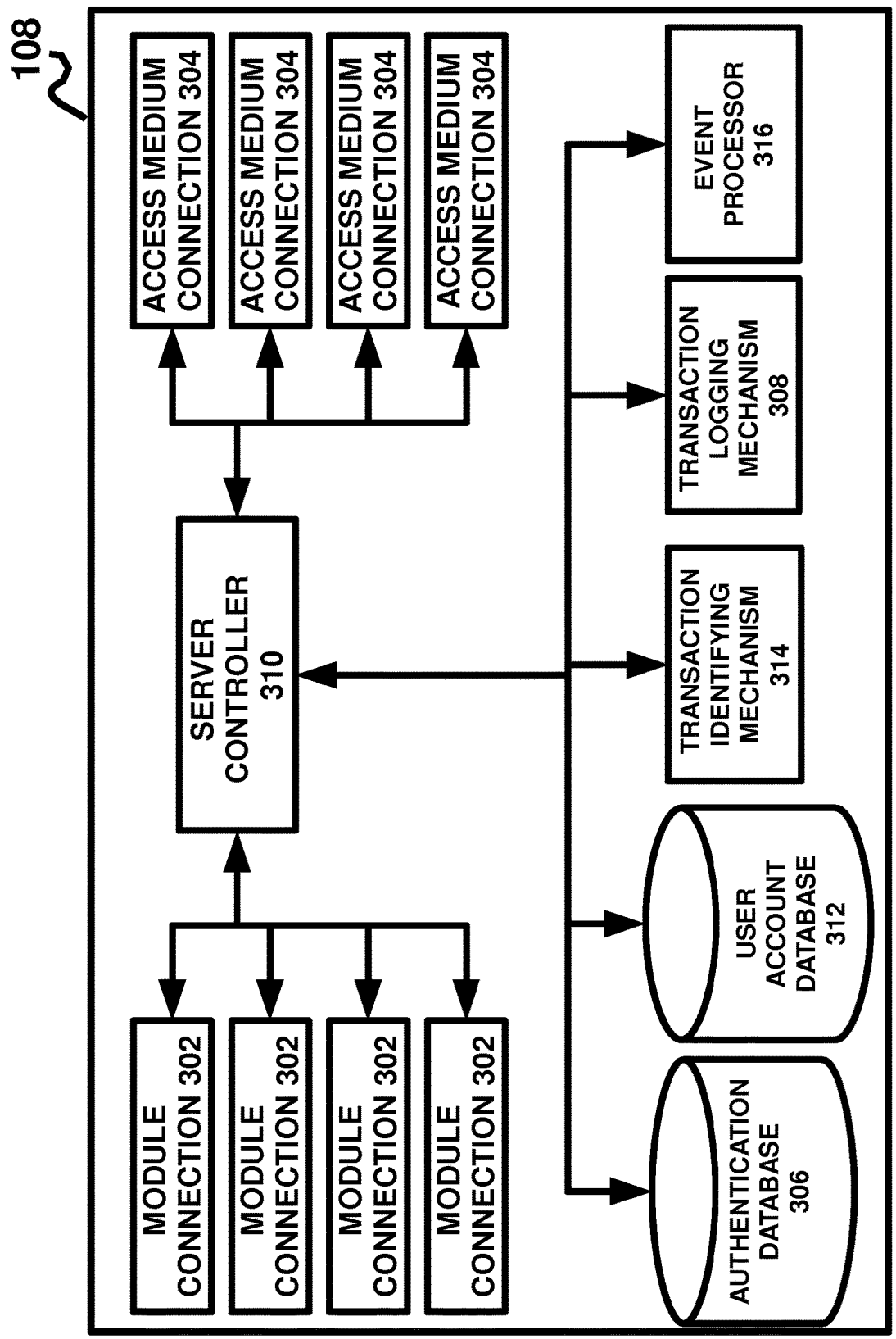
FIG. 3 illustrates an example of an embodiment of a module server enabled to interact with the hardware module of the present invention.
Figure 4:
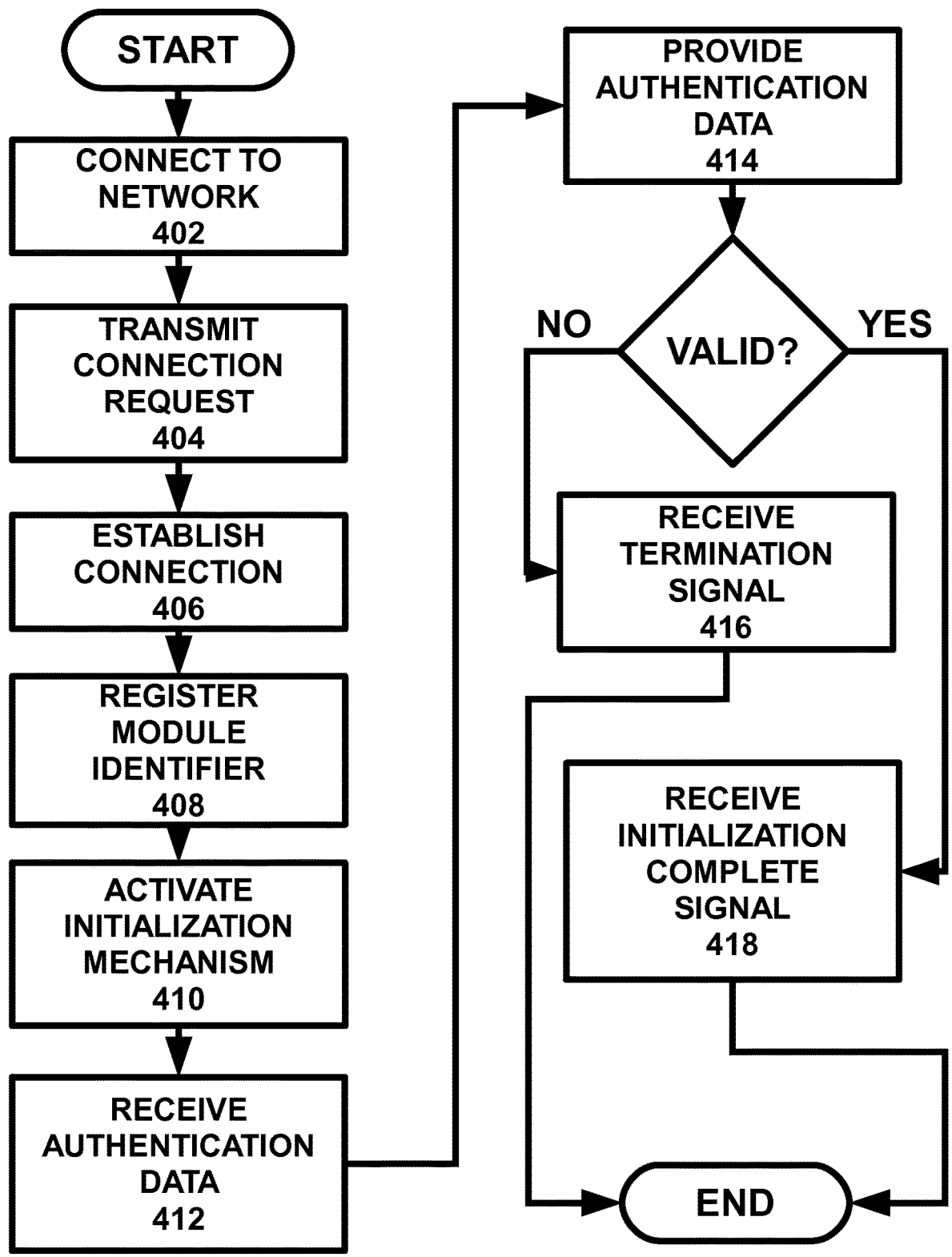
FIG. 4 illustrates a flowchart process of an embodiment of initializing the hardware module of the present invention.

As illustrated by FIG. 2, in one embodiment, the hardware module 102 may include a network connection mechanism 202, a controller mechanism 204, a memory mechanism 206, a power mechanism 208, an initialization mechanism 210, an initialization status display 212, a connectivity status display 214, an I/O channel port 216, and an event processor 218.

The hardware module 102 may be located at a location convenient to the entity employing it. For example, an individual may employ a hardware module 102 at his residence or a small business owner may employ a hardware module 102 at his work location. The hardware module 102 may be located anywhere, so long as the device 106 to be controlled or monitored may connect with the network connection mechanism 202, either directly or via the local network 112.

The controller mechanism 204 may communicate with the components of the hardware module 102 to direct the flow of data, monitor and/or direct the activity of components, and the like. For example, the controller mechanism 204 may communicate with the network connection mechanism 202 to enable the communication of data to and from the hardware module 102. In one embodiment, the controller mechanism 204 is a microcontroller. In addition to enabling the transmission of messages from an interfaced device 106 to the module server 108, the controller mechanism 204 may relay messages from a device 106 interfaced with one I/O channel port 216 (e.g., I/O channel port 216A) to another device 106 interfaced with a different I/O channel port 216 (e.g., I/O channel port 216B).

The network connection mechanism 202 may enable the hardware module 102 to connect to the network 104, and thereby transmit and receive data from the module server 108. In one embodiment, the network connection mechanism 202 may connect with the network 104 via a local network 112. For example, the hardware module 102 may function on any 10/100/1000 Base-T auto-negotiated network. In one embodiment, the network connection mechanism 202 may enable a wired connection. For example, the network connection mechanism 202 may be an Ethernet controller. Alternatively, the network connection mechanism 202 may enable a wireless connection. The hardware module 102 may function via a Dynamic Host Configuration Protocol (DHCP) or static addressing. If the local network 112 is configured for MAC filtering, the MAC address of the hardware module 102 may be added to the local network router's list of allowable addresses. Alternatively, the hardware module 102 may be connected to a non-MAC filtered network first and management tools may be used to change the MAC address of the hardware module 102. Alternatively, the hardware module 102 may connect to the network 104 directly. Additionally, the network connection mechanism 202 may enable the hardware module 102 to interface with one or more devices 106 connected to the local network 112 and/or the network 104.

When the hardware module 102 connects to the network 104, it may establish a communication link with the module server 108. The communication link may be established through any known protocol, such as via Transmission Control Protocol/Internet Protocol (TCP/IP). The hardware module 102 may accept communications from and transmit messages to the module server 108.

The hardware module 102 may include a memory mechanism 206 to store settings. For example, the memory mechanism 206 may be non-volatile random access memory (RAM).

The power mechanism 208 may enable the distribution of power to the hardware module 102. For example, the power mechanism 208 may enable and monitor the receipt of electricity to power the hardware module 102 from an electrical cord or battery.

The initialization mechanism 210 may be used to establish a connective link between the hardware module 102 and a user account at the module server 108. Additionally, the initialization mechanism 210 may enable a user to reset the hardware module 102 to a previous condition, such as its factory condition. The initialization mechanism 210 may be a manual implement. For example, the initialization mechanism 210 may be a button that the user pushes or holds down. Alternatively, the initialization mechanism 210 may be accessible electronically. For example, the user may operate the initialization mechanism 210 via his computer, such as via an access medium 110.

The hardware module 102 may include one or more display mechanisms, such as an initialization status display 212. The initialization status display 212 may relate information associated with the hardware module's 102 connection to the module server 108. For example, the initialization status display 212 may indicate one or more of the following:

the hardware module 102 has booted successfully and is attempting to connect to the local network 112;

the hardware module 102 has established a connection with the local network 112;

the hardware module 102 has successful accomplished a DHCP transaction and now has an IP address;

the hardware module 102 is attempting to resolve remote server's hostname to an IP address;

the hardware module 102 successful DNS hostname resolution;

the hardware module 102 is looking for the Internet gateway MAC address;

the hardware module 102 has found the Internet gateway and is searching for a free a local TCP socket;

the hardware module 102 has located a free local TCP socket and is attempting to connect to the module server 108;

the hardware module 102 has established a successful connection to the module server 108 and authentication has commenced; or the hardware module 102 has successfully undergone authentication and normal operation has commenced.

In one embodiment, the initialization status display 212 is a seven segment LED numeric display.

The hardware module 102 may also include a connectivity status display 214. The connectivity status display 214 may indicate the state of connectivity between the hardware module 102 and the module server 108. For example, the connectivity status display 214 may indicate one or more of the following:

the hardware module 102 is not connected to the module server 108;

the hardware module 102 is connected to the module server 108;

the hardware module 102 is powering up; or the hardware module 102 has disconnected from the module server 108 and is resetting.

The hardware module 102 may also include one or more I/O channel ports 216 that may interface with a device 106. Although four I/O channel ports 216 have been depicted in FIG. 2 (i.e., 216A, 216B, 216C, 216D), this is not to be construed as limiting and the amount may vary depending upon implementation. The device 106 may be any appropriate apparatus, such as a conventional device 106A or a smart device 106B (described in detail below). The hardware module 102 may interface with a device 106 via a wired or wireless connection. For example, an I/O channel port 216 may include an outlet to receive a wired plug. Alternatively, an I/O channel port 216 may be configured to receive a wireless signal. In one embodiment, the user may employ a medium adapter to interface a device 106 with the hardware module 102 wirelessly. The medium adapter may enable various wireless communication methods and may enable the conversion of various communication methods. For example, the medium adapter may enable the conversion of an electronic signal to a fiber optic or radio frequency signal. As mentioned, the network connection mechanism 202 may enable the hardware module 102 to interface with a device 106 via the local network 112, network 104, or a combination thereof. In such a configuration, the network connection mechanism 202 may serve as an I/O channel port 216.

The hardware module 102 may discover an interfaced device 106 manually or automatically. To manually discover a device 106, the user may access his user account and indicate the type of device 106 he had interfaced. For example, a user may access a MBDIS Web site, log into his user account and indicate the type of device 106, such as via a dropdown menu or from a checkbox list. Alternatively, the controller mechanism 204 may include a discovery protocol which may enable plug and play functionality. For example, the discovery protocol may interrogate the controller mechanism 204 to determine whether an interfaced device 106 is a conventional device 106A or a smart device 106B.

In one embodiment, each I/O channel port 216 has a separate digital input, analog input, and digital output. Each I/O channel port 216 may be configured to employ digital input/output, analog input/output, serial data input/output, pulse and frequency counting/generation, audio input/output, video input/output, or the like. The hardware module 102 may be configured to set the state (i.e., the digital voltage level) of output on a particular I/O channel port 216 and may also read a voltage input level. As described below in regard to smart mode, an I/O channel port 216 may serve as a data channel for communication with interfaced smart devices 106B.

The I/O channel ports 216 may be independent from one another and may be the input and output means for the MBDIS 100. Communication from the module server 108 to the hardware module 102 may instruct the hardware module 102 to change output lines on the I/O channel ports 216 while communication from the hardware module 102 to the module server 108 may relay information about device 106 values and other inputs.

An I/O channel port 216 may include multiple lines, or "pins." The functionality of each pin may vary dependent upon the operating mode of the particular I/O channel port 216. An I/O channel port 216 may be capable of operating in one of two modes: normal mode and smart mode.

Normal Mode

When an I/O channel port 216 is set to normal mode, the hardware module 102 may use digital I/O and analog input capabilities native to the controller mechanism 204 to interact with an interfaced device 106. For example, an I/O channel port 216 set to normal mode may be enabled for discreet digital input and/or output, pulse counting, frequency counting, serial input and/or output, and analog input and/or output, or the like. In normal mode, the hardware module 102 may interface with conventional devices, such as analog sensors, switches, lights, liquid crystal displays (LCDs), microcontroller units (MCUs), relays, or the like. A device 106 connected to an I/O channel port 216 set to normal mode may be considered a conventional device 106A.

Smart Mode

When an I/O channel port 216 is set to smart mode, the hardware module 102 may interface with more sophisticated devices 106. Smart mode may convert the I/O channel port 216 into a digital communication port allowing other equipment to interface with the hardware module 102 and an I/O channel port 216 set for this mode may be capable of serial communication via standard and proprietary protocols. For example, smart mode may be employed if a particular function is beyond the scope of a simple analog sensor or digital I/O device. A device 106 interfaced to a smart mode-enabled I/O port channel 216 may be considered a smart device 106B. A smart device 106B may include its own controller mechanism, such as a microcontroller, to manage communication via its particular I/O port channel 216. For example, smart devices 106B may be serial or servo controllers, Infrared receivers and transmitters, video devices, audio devices, USB hardware, wireless transceiver, medium adapters, other peripheral hardware, or the like. Smart devices 106B provide data to the hardware module 102, which may relay it to the module server 108, which may in turn transmit it to an access medium or another hardware module 102. For example, the data may be sent to a networked database for logging. Likewise, messages intended for a smart device 106B may be received by the module server 108, relayed to the hardware module 102 and then transmitted to the smart device 106B. The hardware module 102 need not directly manage a smart device 106B. In one embodiment, the hardware module 102 merely registers the existence of the smart device 106B on startup and directs messages to and from it.

The hardware module 102 may act as a client while the interfaced smart device 106B may function as a server. Despite these roles, this configuration allows for the smart device 106B to generate and transmit a message unsolicited to the hardware module 102 and, in turn, the module server 108.

The hardware module 102 may also include an event processor 218. The event processor 218 may monitor behavior of an interfaced device 106 and, when, a particular event occurs, the event processor 218 may push a message to another device 106 interfaced with the hardware module 102 or to the module server 108 and, in turn, an access medium 110 or one or more additional hardware modules 102. For example, if the device 106 interfaced with the hardware module 102 is a thermometer, the event processor 218 may send a message to a second interfaced device 106 or to the module server 108 when a particular temperature is reached. As another example, the event processor 216 may receive video or audio data and, in turn, initiate a message transmission. In addition to, or instead of, initiating the pushing of data based upon a particular device event, the event processor 218 may push messages via an established schedule. For example, the interfaced device 106 may be a lamp and a user may configure the hardware module 102 to turn on the lamp at a certain time on a certain day. Furthermore, the event processor 218 may communicate data when requested by an access medium 110. For instance, continuing with the thermometer example, the user may employ an access medium 110 to request the thermometer's current temperature reading. Additionally, the event processor 218 may periodically poll the module server 108 for data, commands, or the like. For example, the event processor 218 may query the module server 108 for a device 106 activation command.

As is detailed below, the module server 108 may also include an event processor 316. The event processor 316 located at the module server 108 may be functionally equivalent to the event processor 218 of the hardware module 102. In one embodiment, the hardware module event processor 218 may be synchronized with the configuration maintained by the module server event processor 316. Once configured, the hardware module event processor 218 may enable the hardware module 102 to function autonomously, regardless of whether it has an active connection to the module server 108.

Either, or both, the hardware module event processor 218 and the module server event processor 316 may cause the transmission of a message based on an event associated with one device 106 to a second device 106. In one embodiment, both the first and second devices 106 may be interfaced with the same hardware module 102, either via separate I/O channel ports 216 or the same I/O channel port 216. As such, the event processor 218/316 may cause the relaying of data between two or more devices 106 interfaced with the same hardware module 102.

Module Server

The module server 108 may relay data and instructions between a hardware module 102 and an access medium 110 or a second hardware module 102. The module server 108 may be located remotely from the hardware module 102, but need not be. The module server 108 may include a server controller 310, one or more module connections 302, one or more access medium connections 304, an authentication database 306, a user account database 312, a transaction identifying mechanism 314, a transaction logging mechanism 308, and an event processor 316.

The server controller 310 may enable the flow of data amongst the various components of the module server 108.

A module connection 302 may be a socket waiting and listening for incoming communication from a hardware module 102. A module connection 302 may enable the pulling and pushing of data between the module server 108 and a hardware module 102 (and, in turn, a device 106). An access medium connection 304 is a socket used by the module server 108 to communicate with an access medium 110. An access medium connection 304 may wait and listen for incoming communication from an access medium 110 and may receive conventional requests from Web services, such as Hypertext Transfer Protocol (HTTP) requests. For example, an access medium connection 302 may receive communication originating from a web browser or an automated Common Gateway Interface (CGI) script, desktop application, Web service API, or mobile application. In one embodiment, the module connections 302 and the access medium connections 304 wait and listen on different ports to ensure proper communication.

The authentication database 306 may maintain information pertinent to module identifiers (e.g., serial numbers). The authentication database 306 may maintain a record of all module identifiers for all hardware modules 102 distributed by the MBDIS service provider. The authentication database 306 may also maintain data pertaining to encryption. For example, when a hardware module 102 initiates a connection with the module server 108, the server controller 310 may access the authentication database 306 to locate a module identifier and its corresponding encryption key to authenticate the connection. If the module identifier is located and the encryption is successful, the hardware module 102 may interface with the module server 108 and, in turn, an access medium 110. Alternatively, if a corresponding module identifier is not found or encryption fails, the server controller 310 may close the connection.

The module server 108 may include a transaction logging mechanism 308 to record transactions with one or more hardware modules 102. The transaction logging mechanism 308 may be configured to record all transactions that are handled by the module server 108 and/or those indicated by the configurations established via the module server event processor 316 or the hardware module event processor 218. The recorded data may be employed to analyze system data, such as to create charts, plots, or calculate values for record-keeping or event triggering.

The module server 108 may also include a transaction identifying mechanism 314. As described in detail below, the transaction identifying mechanism 314 may associate a transaction identifier with each transmission sent to the hardware module 102 to ensure successful interaction between the module server 108 and the hardware module 102.

A user account database 312 may maintain user accounts for individuals who have registered their hardware modules 102 with the MBDIS 100. A user account may include various information associated with the user, such as contact information (name, mailing address, email address, phone numbers, latitude/longitude, etc.), information particular to the user's hardware module(s) 102 (model data, make data, a module identifier, etc.), authentication information (e.g., username and password), financial account information (e.g., credit card numbers, etc.), device identifiers for devices 106 (e.g., MAC addresses, IP addresses, etc.) or the like. An individual may create a user account prior to initializing his hardware module 102. To create a user account, the user may provide the MBDIS service provider with the necessary information via a Web site, email, mail, verbally (e.g., via a customer service representative), fax, or the like.

As aforementioned, the module server 108 may include an event processor 316. The event processor 316 may push a message to an access medium 110 or second hardware module 102 per an event that has occurred at a device 106 that is interfaced with a first hardware module 102. This configuration may enable a user to monitor the performance of a device 106 in real time. In one scenario, the access medium 110 may be an email service, a text messaging service (e.g., Short Message Service (SMS), etc.), a social network service, or the like. For example, if the device 106 is a thermometer, the event processor 316 may push a message to a social networking service, such as Facebook, when the thermometer reaches a certain temperature, and the temperature data may be displayed as a status update. As another example, the temperature data may be sent to an email service and the user may receive the data in an email message. As with the hardware module event processor 218, the module server event processor 316 may also transmit messages on a scheduled, periodic basis. For example, the event processor 316 may transmit an activation command to the hardware module 102 on a scheduled basis. In addition to pushing messages, the event processor 316 may provide data or a command when requested by an access medium 110 or a hardware module 102.

A user may access his user account via, for example, the MBDIS Web site and configure one or more triggers and corresponding action(s) for his registered hardware module (s) 102. As mentioned above, the user may also initiate a synchronization process whereby the module server event processor 316 settings are synchronized with those of a hardware module event processor 218, thereby configuring the hardware module 102.

The synchronization process may enable a user to configure the hardware module 102 to poll the module sever 108 for data periodically, such as at a particular time or on a particular schedule. For example, the user may access his user account to configure the hardware module 102 to query the module server 108 every fifteen minutes. The synchronization process may be used to instruct the hardware module 102 to issue a query related to a device 106, such as a request for data or a command. For example, the user may configure the hardware module 102 to query the module server 108 for activation commands. After the user has configured the polling setting, the module server 108 may transmit this instruction, including the appropriate device identifier, to the hardware server 102, where it may be stored, thereby configuring the hardware module 102 to issue query per the established setting. If the hardware module 102 is enabled to store a device identifier, the user may configure the hardware module 102 to generate and transmit a message (e.g., an activation message) to an interfaced device 106 without polling the module server for an activation command).

Regarding communication between a first hardware module 102 and a second hardware module 102, the event processor 316 may provide instructions to the second hardware module 102 based on an event that occurred at the first hardware module 102. For example, the event processor 316 may receive temperature data from a thermometer device 106 interfaced with the first hardware module 102 and, if the temperature data indicates a temperature higher than a certain threshold, the event processor 316 may send a message to the second hardware module 102 instructing it to activate an interfaced cooling device 106. The event processor 316 may act in a similar fashion to relay messages between two or more devices 106 interfaced with the same hardware module 102. For instance, the event processor 316 may receive temperature data from a thermometer device 106 interfaced with one I/O channel port 216 and send a message to a cooling device 106 interfaced with a second I/O channel port 216 on the same hardware module 102. In another example, the device 106 interfaced with the hardware module 102 may be a data storage medium and the user may employ the data storage medium to record data regarding a second device 106 interfaced with a different I/O channel port 216 or another hardware module 102.

In addition, or instead of, sending a message to an access medium 110 or a hardware module 102, the event processor 316 may send data to the transaction logging mechanism 308. The user may employ this configuration when he wishes to, for example, record data from a device 106, but does not desire real-time monitoring. Additionally, the transaction logging mechanism 308 may enable various visualization processes so that data recorded via the event processor 316 may be analyzed. For example, data recorded by the transaction logging mechanism 308 may be accessible via an access medium 110, such as a Web widget that may display the recorded data as a chart or graph.

The event processor 316 may also be enabled to transmit data to an external database for recordation, analysis, or the like.

Access Medium

The access medium 110 may be a mechanism by which a user may interact, via the module server 108, with a device 106 interfaced with a hardware module 102. For example, an access medium 110 may be an API, a Web service, a Web interface, or the like. As aforementioned, via an access medium 110, a user may control or monitor a device 106. For example, an access medium 110 may request data from a device 106, translate data generated by a device 106 into a useful syntax and display it, push a command to a device 106, activate an inactive device 106, or the like. The access medium 110 may be provided by portable, client-side scripting that allows for embedding control and monitoring resources into Web sites, mobile device applications and widgets, Web service feeds, social networks, Web service APIs, or the like. The access medium 110 interpret data received from a device 106 and present the data to users and Web services in current and appropriate scales, formats, and syntaxes. For example, an access medium 110 may receive data from a thermometer device 106 and present that data in degrees Fahrenheit or Centigrade. The access medium 110 may receive data based upon push data transmission initiated by an event processor 218/316, may request data itself, or it may access data recorded in the transaction logging mechanism 308 (e.g., to display such logged data a chart, graph, or the like).

Additionally, an access medium 110 may also allow a user to configure the hardware module 102 and/or its interfaced devices 106 via the module server 108. For example, the user may set an I/O channel port 216 to normal mode or smart mode.

An access medium 110 may be accessible via Web-enabled devices, such as personal computers (e.g., desktop computer, laptop computers, tablet computers, etc.) and mobile devices (e.g., mobile phones, smart phones, personal digital assistants, etc.).

To enhance user convenience, the MBDIS service provider may offer one or more access mediums 110 to users. For example, a user may visit an MBDIS Web site and access ready-made Web widget coding that may be input into the coding of a Web page in order to control or monitor a device 106 from the Web page. The MBDIS service provider may provide access mediums 110 for common functionalities, such as light levels, temperature display, weather information, and the like. The MBDIS sever provider may also provide a convenient interface by which a user may create a customized access medium 110. For example, an MBDIS Web site may include a point and click interface, a wizard interface, or another form of customized programming interface by which a user may generate a customized access medium 110 suitable to the user's needs and/or the particular functionality of a device 106.

Hardware Module Initialization

In order for a user to employ to a hardware module 102, he may be required to authenticate it with the module server 108, thereby linking his hardware module 102 to his user account. The MBDIS service provider may employ an authentication process in order to confirm that an actual individual wishing to employ a particular hardware module 102 is initializing the hardware module 102, rather than an automated process. This may ensure that the hardware module 102 is being employed with the user's permission.

To begin initialization, the user may connect his hardware module 102 to the network 104 (step 402). As aforementioned, the user may connect his hardware module 102 to the network 104 via a local network 112. The hardware module 102 may then transmit a connection request to the module server 108 (step 404). The module server 108 may be configured to listen to the network 104 and enabled to await such requests. Once a connection has been established between the module server 108 and the hardware module 102 (step 406), the connectivity status display 214 may indicate this (e.g., by displaying a green light).

The user may then register a module identifier associated with the hardware module 102 with the module server 108 (step 408). In one embodiment, the user may register a module identifier by associating it with a user account maintained by the module server 108. The module identifier may be, for example, a serial number included on the hardware module 102 and/or documentation provided to the user when the hardware module 102 was acquired. The module identifier may also be included in firmware maintained by the hardware module 102. In addition to registering the module identifier, the user may register contact information, authentication information (e.g., username and password), financial account information, or the like.

The registration process may involve the user establishing a user account with the MBDIS service provider. The user may establish the user account prior to the initialization. Additionally, the user may be allowed to register multiple hardware modules 102 with the same user account and, therefore, may employ the initialization process to add an additional hardware module 102 to an existing user account. In one embodiment, the user may establish a user account by employing a computing device (e.g., personal computer, mobile device, etc.) to access a Web site linked to the module server 108. Once at the Web site, the user may register the module identifier and other information. In alternate embodiments, the user may establish and/or augment a user account via other methods. For example, a user may verbally establish an account by calling the MBDIS service provider and providing the necessary information to a customer service representative. As another example, a user may complete a registration form and mail, email, or email it to the MBDIS service provider.

Once the user has registered the module identifier with his user account, he may activate the initialization mechanism 210 (step 410). For example, if the initialization mechanism 210 is an external button, the user may hold the button for particular amount of time (e.g., five seconds). The initialization status display 212 may indicate to the user that initialization has commenced.

The hardware module 102 may receive authentication data transmitted from the module server 108 (step 412). The hardware module 102 may display this authentication data to the user via the initialization status display mechanism 212. For example, the module server 108 may transmit a series of digits to the hardware module 102 and the initialization status display mechanism 212 may display the digits to the user.

The user may provide the transmitted authentication data to the MBDIS service provider (step 414). In one embodiment, the user may enter the displayed authentication data at a Web site linked to the module server 108. The user may do so during the same session with which he registered the module identifier. In alternate embodiments, the user may provide the authentication data by verbally relating it to a customer service representative (e.g. via telephone), or by mailing, emailing, or faxing the authentication data to the MBDIS service provider.

The provided authentication data is relayed to the module server 108, which analyzes it to determine if it is valid. If the provided authentication data is incorrect, the user may be requested to provide it again. If the user cannot successfully do so, the hardware module 102 may receive a termination signal from the module server 108 (step 416) and the hardware module 102 may not be activated. If the authentication data is deemed valid, the hardware module 102 may receive a signal from the module server 108 indicating that the initialization is complete (step 418). The hardware module 102 may now have an active connection with the module server 108 and the initialization display mechanism 212 may signal the end of initialization.

Communication Between the Hardware Module and the Module Server

As aforementioned, the configuration of the MBDIS 100 may enable the hardware module 102 to serve as a client rather than a server. The hardware module 102 may issue transmissions via the network 104 to the module server 108 without the module server 108 replying immediately. In one embodiment, Internet Protocol (IP), such as HTTP protocol, may be used for communication between the hardware module 102 and the module server 108. The hardware module 102 may act as a client and issue requests to the module server 108. The module server 108 need not reply immediately, thereby allowing the hardware module 102 to send another request to push data to the module server 108. Although it may, the hardware module 102 need not request anything from the module server 108. Once the hardware module 102 makes its initial connection, requests may be generated by the module server 108. The hardware module 102 may push data to the module server 108 and may do so without being solicited. In one embodiment, the hardware module 102 may transmit HTTP POST requests, which are not cached by web proxy servers. Furthermore, the use of HTTP POST transmissions with no immediate reply from the module server 108 enables web proxy servers to manage the communication between the hardware module 102 and module server 108 as standard HTTP traffic, thereby alleviating unnecessary burden upon the MBDIS 100.

Figure 5:
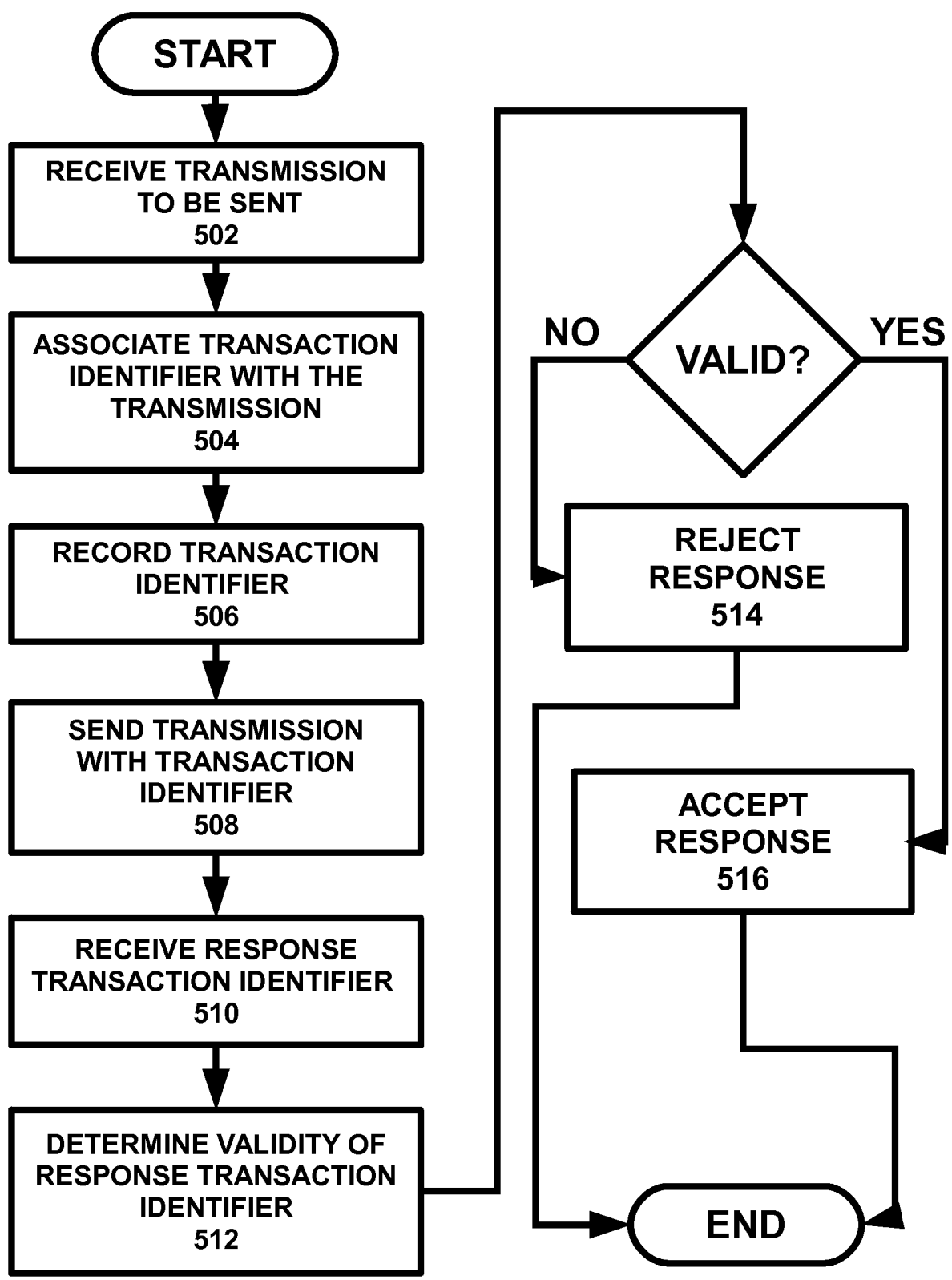
FIG. 5 illustrates a flowchart process of an embodiment of a module server communicating with the hardware module of the present invention.

The module server 108 may manage numerous connections simultaneously. Since the module server 108 may request data from the hardware module 102 in addition to the hardware module 102 being able to send data to the module server 108, there is the possibility that data messages may cross in transit. As illustrated by FIG. 5, the transaction identifying mechanism 314 may prevent any problem that may occur due to such a situation. The server controller 310 may receive a transmission to be sent to the hardware module 102 (step 502). For example, a user may employ an access medium 110 to send control instructions to the hardware module 102 or the event processor 316 may wish to send data to a hardware module 102 per an event triggered by a device 106. The transaction identifying mechanism 314 of the module server 108 may associate a transaction identifier with each transmission to be sent to the hardware module 102 (step 504). The transaction identifying mechanism 314 may record this transaction identifier (step 506). For example, the module server 108 may issue a unique, six digit transaction identification code with each request sent to the hardware module 102. The module server 108 may send the transmission with its associated transaction identifier to the hardware module 102 (step 508). The module server 108 may receive a response transmission from the hardware module 102 and the response may include a transaction identifier, such as in a Uniform Resource Identifier (step 510). The transaction identifying mechanism 314 may compare the received transaction identifier with those it has recorded to determine if the response is a valid transmission (step 512). If the received transaction identifier does not match one recorded, the response may be rejected (step 514). If the received transaction identifier matches on record, the response is deemed a valid transmission and accepted (step 516). As aforementioned, the hardware module 102 may transmit data unsolicited. For such transmissions, the controller mechanism 204 of the hardware module 102 may associate a particular transaction identifier with all unsolicited transmissions and the transaction identifying mechanism 314 may be configured to treat all such transmissions as valid. For example, the hardware module 102 may use the transaction identifier "000000" for all unsolicited transmissions.

For example, in one scenario, a message from the hardware module 102 may be formatted as follows:
POST/001234 HTTP/1.1

Host: www.hardwareserver.com
Content-Encoding: application/octet-stream
Cache-Control: no-transform, no-store, private
Content-Length: 15
Message: Hh8S1ykd08Mp82g In the example above, the transaction identifier is 001234.

As another example, a request from the module server 108 to the hardware module 102 may be formatted as the following:

HTTP/1.1 200 OK
Date: Mon, 14 Jul. 2008 04:28:18 GMT
Cache-Control: no-transform, no-store, private
Content-Encoding: application/octet-stream
Content-Length: 23
Message: uN05aJdnaSneH96hu6ds11

In this example, the transaction identifier is included, and encrypted, in the message body (e.g., 059611).

Messages Pushed by the Hardware Module to the Module Server

As mentioned, the hardware module 102 may generate and transmit messages on its own volition. For example, rather than the module server 108 periodically polling the hardware module 102 for the status of a digital input, the event processor 218 of the hardware module 102 may push a message at the instant it receives an indication from an I/O channel port 216 that an event has occurred at an interfaced device 106. As another example, the event processor 218 may periodically poll the module server 108 for any received requests it has stored. The hardware module 102 may push data to the module server 108 or a device 106 on a separate I/O channel port 216 via auto-messaging, triggered messaging, or a smart device push. Auto-messaging and triggered messaging may be accomplished via an I/O channel port 216 set to normal mode, while a smart device push may be handled via smart mode.

To push data via auto-messaging, the event processor 218 of the hardware module 102 may be configured to send the state of the I/O channel port 216 (and therefore the interfaced conventional device 106A) automatically at a set schedule. For example, an analog input value may be sent every fifteen seconds. Each I/O channel port 216 may be set to send either its analog input or digital input at a user determined schedule. Each I/O channel port 216 auto-message interval may be set independently.

Data may be pushed via triggered messaging when the state of a digital or analog input from the interfaced conventional device 106A changes. Each I/O channel port 216 may have a configurable trigger and reset value. The hardware module 102 may send a message when an input reaches a certain level.

If the I/O channel port 216 is set to smart mode, the hardware module 102 may transmit an unsolicited message from the smart device 106B. The message may be sent on behalf of the configuration of the smart device 106B itself. For example, particular events, activities, actions, or the like that occur via the smart device 106B may initiate the transmission of data to the hardware module 102 and in turn the module server 108 or another device 106 interfaced with a separate I/O channel port 216.

Waking-on-LAN via the Hardware Module and the Module Server

The hardware module 102 and module server 108 may be employed to enable Wake-on-LAN (WOL) procedures. It is to be understood that "WOL" as used herein encompasses wired network configurations, wireless (e.g., Wake-on-Wireless LAN) network configurations, or combinations thereof. Although the description herein typically describes activating an inactive device 106 in terms of a device 106 interfaced with a hardware module 102 via a local network 112, this is not to be construed as limiting. In alternate embodiments, the process described herein may be employed to activate a device 106 interfaced with the hardware module 102 directly or via the network 104. Furthermore, although the module server 108 is described typically herein as being remote from the local network 112, the hardware module 102, and/or the device 106, this is not to be construed as limiting, and the module server 108 may be located locally.

The configuration described herein consumes significantly less power than traditional WOL arrangements and may allow all unnecessary devices to be inactive until their services are required (thereby consuming significantly less power than a typical WOL system). For example, instead of providing power to an entire computer system, power need only be provided to the hardware module 102 and an activation component of the inactive device 106, such as a network interface card (NIC).

Figure 6:
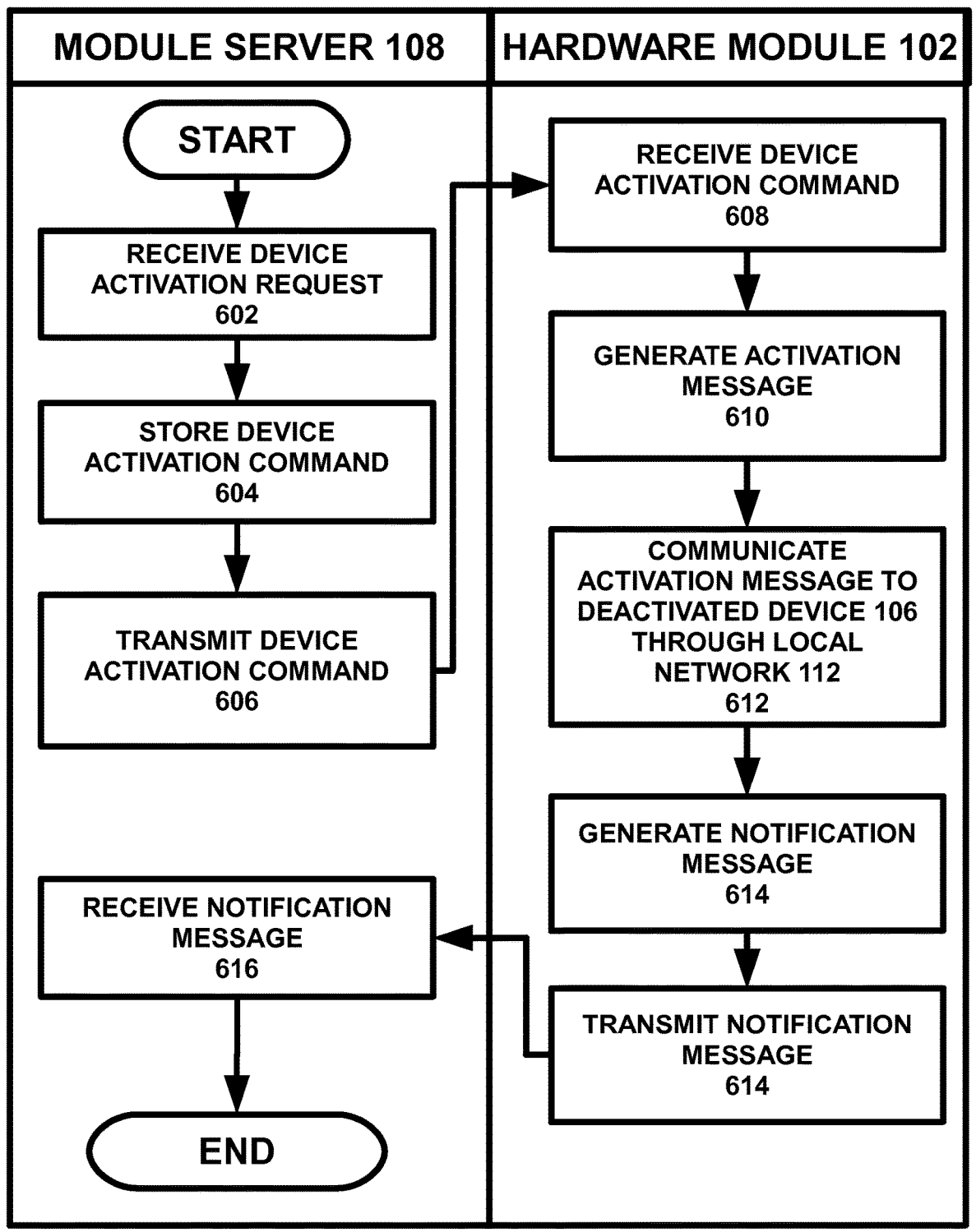
FIG. 6 illustrates a flowchart process of an embodiment of activating a device via the hardware module and the module server of the present invention.

FIG. 6 depicts an embodiment of activating a device 106, such as a computer, via the hardware module 102 and module server 108. The module server 108 may receive a request from an access medium 110 to instruct a hardware module 102 to activate an inactive device 106 (step 602). As the module server 108 may be connected to the Internet or another WAN, the request may be initiated from a location remote from the inactive device 106 and the local network 112.

A user may issue the request manually. For example, the user may select a button on a Web widget interface to issue a request to activate an inactive device 106. The associated device identifier may be stored in an appropriate user account and the module server 108 may access it per the request. As another example, the user may establish a reference for a stored device identifier and provide this reference to activate the device 106. For example, the user may establish the reference "printer1" for the MAC address "0123456789ab," and transmit a message including "printer1" via the access medium 110. The activation request also may be sent via an automated mechanism. For example, a user may configure an access medium 110 to initiate an activation request at a particular time, set a schedule for activation requests, or the like. Alternatively, a device may initiate the activation request.

In another scenario, the activation request may include the necessary device identifier. For example, a user may enter a MAC address into a text box included in a Web widget and the MAC address may be sent to the module server 108.

Once the activation request has been received, the module server 108 may store a device activation command including the device identifier until it is to be sent to the hardware module 102 (step 604). As aforementioned, the hardware module 102 may connect with the module server 108 outside the local network 112 via a TCP/IP connection. The device activation command may be transmitted to the hardware module 102 immediately, at a particular time increment, on a schedule, or when it is requested by the hardware module 102 (step 606). The hardware module 102 may be configured to periodically poll the module server 108 for instructions, such as at a set interval, rather than wait for the module server 108 to push an activation command to it. The hardware module 102 may store device identifiers for one or more of the networked devices 106 and may poll the module server 108 by transmitting a query including such an identifier. If the module server 108 has stored a corresponding device activation command, it may send it to the hardware module 102.

After receiving the device activation command (step 608), the hardware module 102 may generate an activation message to be sent to the inactive device 106 (step 610). The activation message may include the device identifier included in the activation command. In this scenario, the activation message may be a "magic packet."

The configuration described herein consumes significantly less power than traditional WOL arrangements and may allow all unnecessary devices to be inactive until their services are required (thereby consuming significantly less power than a typical WOL system). For example, instead of providing power to an entire computer system, power need only be provided to the hardware module 102 and an activation component of an inactive device 106, such as a network interface card (NIC).

The hardware module 102 may generate a notification message regarding its transmission of the activation message (step 614) and transmit the notification message to the module server 108, thereby indicating that the activation message has been sent (step 614). The module server 108 may receive the notification message (step 616) and in turn notify the access medium 110. The user may confirm that the device 106 has been activated by attempting to access it.

In one scenario, the hardware module 102 may be configured to generate and issue an activation message without polling the module server 108. As aforementioned, the user may access his user account to configure the hardware module 102 to perform one or more actions. As the hardware module 102 may be configured to store a device identifier itself, its event processor 218, may cause the hardware module 102 to generate and transmit an activation message with a stored device identifier at a predetermined time, per a predetermined schedule, or the like.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

The invention claimed is:

1. A system comprising:
a server;
a first device;
a first hardware module interfaced with the first device and configured to be a first client to the server by initiating establishment of at least one connection between the first hardware module and the server, wherein the first hardware module is not directly coupled to any other hardware modules;
a second device that is inactive; and
a second hardware module interfaced with the second device via a local area network (LAN) and configured to be a second client to the server by initiating establishment of at least one connection between the second hardware module and the server, wherein the second hardware module is not directly coupled to any other hardware modules;
the server interfaced with the first hardware module and the second hardware module, where the server includes a server processor configured to:
receive from the first hardware module an activation request indicating that the second device is to be activated; and
transmit an activation command to the second hardware module after receiving the activation request from the first hardware module wherein the activation command is transmitted to the second hardware module based on one of (i) a selected time determined by the server, (ii) a predetermined schedule, or (iii) when it is requested by the second hardware module, where the second hardware module includes a second hardware module processor configured to activate the second device via the LAN in response to receiving the activation command from the server, wherein the second device is identified via a device identifier included in the activation command.

2. The system of claim 1, wherein the server is located outside the LAN.

3. The system of claim 1, wherein the device identifier is a media access control address.

4. The system of claim 1, wherein the server processor is further configured to:
store the device identifier identifying the second device that is inactive.

5. The system of claim 1, wherein the server processor is further configured to:
receive the device identifier included in the activation request including information to activate the second device that is inactive.

6. The system of claim 1, wherein the second hardware module is further configured to store the device identifier identifying the second device that is inactive.

7. The system of claim 1, wherein the server processor is further configured to receive the activation request from one or more of a Web service and an application programming interface.

8. The system of claim 1, wherein the server and the first hardware module are configured to communicate via the Internet.

9. A method comprising:
receiving, at a server external to a local network, a request to activate an inactive second device from a first hardware module coupled to the server and a first device, wherein the first hardware module is not directly coupled to any other hardware modules,
the inactive second device being interfaced with a second hardware module via the local network, wherein the first hardware module is a first client to the server by initiating establishment of at least one connection between the first hardware module and the server and the second hardware module is a second client to the server by initiating establishment of at least one connection between the second hardware module and the server, wherein the second hardware module is not directly coupled to any other hardware modules; and
transmitting, from the server to the second hardware module, an activation command, wherein the activation command identifies the inactive second device and instructs the second hardware module to transmit the activation command to the inactive second device via the local network to activate the inactive second device, wherein the activation command is transmitted from the server to the second hardware module bades on one of (i) a selected time determined by the server, (ii) a predetermined schedule, or (iii) when it is requested by the second hardware module.

10. The method of claim 9, wherein the activation command identifies the inactive second device via a device identifier.

11. The method of claim 9, wherein the request to activate the inactive second device includes a device identifier for the inactive second device.

12. The method of claim 9, further comprising receiving, at the server from the second hardware module, a notification message indicating that the activation message has been transmitted.

13. A method for activating an inactive device, the method comprising:
   sending a request from a first hardware module to a server to activate a first device in an inactive state, wherein the first hardware module is a first input/output apparatus and a first client with the server by initiating establishment of at least one connection between the first hardware module and the server, and wherein the first hardware module is not directly coupled to any other hardware modules,
   receiving, at a second hardware module coupled to the server and to the first device, the request to active the first device that is in an inactive state, wherein the second hardware module is a second input/output apparatus and a second client with the server by initiating establishment of at least one connection between the second hardware module and the server, wherein the second hardware module is not directly coupled to any other hardware modules, and further wherein the request is received at the second hardware module from the server based on one of (i) a selected time determined by the server, (ii) a predetermined schedule, or (iii) when it is requested by the second hardware module;
   generating, at the second hardware module, an activation message, wherein the activation message includes a device identifier of the first device in the inactive state; and
   transmitting, by the second hardware module, the activation message over a local network to the first device, the first device utilizing the activation message to transition the first device from the inactive state to an active state.

14. The method of claim 13, further comprising transmitting, from the second hardware module to the server, a notification message indicating that the activation message has been transmitted over the local network to the first device.

15. The method of claim 13, wherein the device identifier is received from the server.

16. The method of claim 13, wherein the device identifier is stored at the second hardware module.

17. The method of claim 13, wherein the request received at the second hardware module indicates a time at which the activation message is to be generated at the second hardware module and transmitted by the second hardware module to the first device.

18. A system comprising:
   a first hardware module that is a first input/output apparatus coupled to a server and a first client to the server by initiating establishment of at least one connection between the first hardware module and the server, and wherein the first hardware module is not directly coupled to any other hardware modules, the first hardware module configured to
      send a request to the server to active a first device that is in an inactive state;
   a second hardware module configured to:
      receive the request from the server, wherein the second hardware module is a second input/output apparatus coupled to the server and a second client to the server by initiating establishment of at least one connection between the second hardware module and the server, wherein the request is received from the server based on one of (i) a selected time determined by the server, (ii) a predetermined schedule, or (iii) when it is requested by the second hardware module, wherein the second hardware module is not directly coupled to any other hardware modules, and wherein the request indicates a time at which an activation message is generated at the second hardware module and transmitted by the second hardware module to the first device in the inactive state,
      generate an activation message at the time indicated in the request, wherein the activation message includes a device identifier of the first device coupled to the second module, the first device being in an inactive state, and
      transmit, at the time indicated in the request, the activation message over a local network to the first device, the first device utilizing the activation message to transition the first device from the inactive state to an active state.

19. The system of claim 18, the first hardware module further configured to:
   receive one or more values from a second device, wherein the one or more values are associated with an operation of the second device;
   compare the one or more values to a threshold value;
   in response to the one or more values being greater than the threshold value, determine that a condition was met at the second device; and
   send the request to the server in response to determining that the condition was met.

20. The system of claim 18, wherein a web widget is configured to control the first device after the first device is activated.

21. The system of claim 18, wherein the request is received through an Application Program Interface (API).

22. The system of claim 18, wherein the first hardware module is further configured to:
   receive one or more values from a second device, wherein the one or more values are associated with an operation of the second device;
   compare the one or more values to a threshold value;
   in response to the one or more values being less than the threshold value, determine that a condition was met at the second device; and
   send the request to the server in response to determining that the condition was met.

* * * * *